(12) United States Patent
Kinoshita et al.

(10) Patent No.: US 10,036,684 B2
(45) Date of Patent: Jul. 31, 2018

(54) LEAKAGE DETERMINATION SYSTEM AND LEAKAGE DETERMINATION METHOD

(71) Applicant: NEC CORPORATION, Tokyo (JP)

(72) Inventors: Shohei Kinoshita, Tokyo (JP); Yasuhiro Sasaki, Tokyo (JP); Nobuhiro Mikami, Tokyo (JP); Masatake Takahashi, Tokyo (JP); Shin Tominaga, Tokyo (JP); Shigeki Shinoda, Tokyo (JP); Soichiro Takata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 151 days.

(21) Appl. No.: 15/034,027

(22) PCT Filed: Nov. 10, 2014

(86) PCT No.: PCT/JP2014/005641
§ 371 (c)(1),
(2) Date: May 3, 2016

(87) PCT Pub. No.: WO2015/072130
PCT Pub. Date: May 21, 2015

(65) Prior Publication Data
US 2016/0282219 A1 Sep. 29, 2016

(30) Foreign Application Priority Data
Nov. 12, 2013 (JP) .................................. 2013-233848

(51) Int. Cl.
*G01M 3/00* (2006.01)
*G01M 3/24* (2006.01)
(Continued)

(52) U.S. Cl.
CPC .............. *G01M 3/243* (2013.01); *G01M 3/00* (2013.01); *G01M 3/002* (2013.01); *G01M 3/24* (2013.01); *G01M 3/26* (2013.01); *G01M 3/2815* (2013.01)

(58) Field of Classification Search
CPC .......... G01M 3/00; G01M 3/002; G01M 3/24; G01M 3/243; G01M 3/26; G01M 3/28; G01M 3/2815
See application file for complete search history.

(56) References Cited

U.S. PATENT DOCUMENTS 5,117,676 A * 6/1992 Chang .................... G01M 3/242
73/40.5 A
5,272,646 A * 12/1993 Farmer ............... G01M 3/2815
340/605
(Continued)

FOREIGN PATENT DOCUMENTS

GB 2369677 A * 6/2002 ............ G01M 3/243
JP 57001944 A * 1/1982 .............. G01M 3/24
(Continued)

OTHER PUBLICATIONS

International Search Report for PCT/JP2014/005641 dated Feb. 10, 2015 [PCT/ISA/210].
(Continued)

*Primary Examiner* — Nguyen Ha
(74) *Attorney, Agent, or Firm* — Sughrue Mion, PLLC (57) ABSTRACT

In a related fluid leakage detecting device, erroneous leakage determination may occur due to a change in a state of a fluid in piping.
A leakage determination system of the present invention includes a first detection means for detecting a prescribed physical quantity indicating a state of a fluid in piping, a second detection means for detecting vibration propagating through the piping, and a leakage determination means for
(Continued)

performing leakage determination based on the physical quantity detected by the first detection means and the vibration detected by the second detection means.

3 Claims, 8 Drawing Sheets

(51) Int. Cl.
    *G01M 3/26*     (2006.01)
    *G01M 3/28*     (2006.01)

(56) References Cited

U.S. PATENT DOCUMENTS

| | | | | |
|---|---|---|---|---|
| 5,388,445 A * | 2/1995 | Walters | ............ | G01M 3/243 |
| | | | | 73/40.5 R |
| 5,531,099 A * | 7/1996 | Russo | ............ | G01M 3/243 |
| | | | | 73/40.5 A |
| 5,675,506 A * | 10/1997 | Savic | ............ | F17D 5/06 |
| | | | | 702/51 |
| 7,107,822 B2 * | 9/2006 | Zachary | ............ | G01M 3/2869 |
| | | | | 137/312 |
| 2011/0093220 A1 * | 4/2011 | Yang | ............ | G01M 3/243 |
| | | | | 702/51 |
| 2012/0007743 A1 * | 1/2012 | Solomon | ............ | G01M 3/243 |
| | | | | 340/605 |
| 2012/0007744 A1 * | 1/2012 | Pal | ............ | G01M 3/243 |
| | | | | 340/605 |
| 2015/0253216 A1 * | 9/2015 | Shinoda | ............ | G01M 3/243 |
| | | | | 702/51 |
| 2016/0076964 A1 * | 3/2016 | Shinoda | ............ | G01M 3/243 |
| | | | | 73/40.5 A |

FOREIGN PATENT DOCUMENTS

| | | | | |
|---|---|---|---|---|
| JP | 58010623 A | * | 1/1983 | ............ G01M 3/243 |
| JP | 62-55540 A | | 3/1987 | |
| JP | 1-180729 U | | 12/1989 | |
| JP | 3-279833 A | | 12/1991 | |
| JP | 2576917 B2 | | 1/1997 | |
| JP | 2005-265663 A | | 9/2005 | |
| JP | 4745170 B2 | | 8/2011 | |

OTHER PUBLICATIONS

Written Opinion for PCT/JP2014/005641 dated Feb. 10, 2015 [PCT/ISA/237].

* cited by examiner

| STATE | STANDARDIZED WATER PRESSURE [a.u.] | STANDARDIZED PEAK FREQUENCY [a.u.] |
|---|---|---|
| a | 1 | 1 |
| b | 2.2 | 1.7 |

Fig. 10

| WATER PRESSURE [Pa] | MONITORED FREQUENCY RANGE [Hz] |
|---|---|
| $P_1$ | $f_{11} \sim f_{12}$ |
| $P_2$ | $f_{21} \sim f_{22}$ |
| $P_3$ | $f_{31} \sim f_{32}$ |

Fig. 11

| LEAKAGE DETERMINATION METHOD | LEAKAGE DETECTION RATE [%] |
|---|---|
| RELATED ART | 70 |
| FIRST EXAMPLE | 85 |

Fig. 12

| STATE | STANDARDIZED WATER PRESSURE [a.u.] | STANDARDIZED VIBRATION AMPLITUDE [a.u.] |
|---|---|---|
| c | 1 | 1 |
| d | 2.2 | 30 |

Fig. 13

| WATER PRESSURE [Pa] | LEAKAGE DETERMINATION THRESHOLD VALUE [dBV] |
|---|---|
| $P_1$ | $A_1$ |
| $P_2$ | $A_2$ |
| $P_3$ | $A_3$ |

Fig. 14

| LEAKAGE DETERMINATION METHOD | LEAKAGE DETECTION RATE [%] |
|---|---|
| RELATED ART | 70 |
| SECOND EXAMPLE | 85 |

Fig. 15

| WATER PRESSUR [Pa] | MONITORED FREQUENCY RANGE [Hz] | LEAKAGE DETERMINATION THRESHOLD VALUE [dBV] |
|---|---|---|
| $P_1$ | $f_{11} \sim f_{12}$ | $A_1$ |
| $P_2$ | $f_{21} \sim f_{22}$ | $A_2$ |
| $P_3$ | $f_{31} \sim f_{32}$ | $A_3$ |

Fig. 16

| LEAKAGE DETERMINATION METHOD | LEAKAGE DETECTION RATE [%] |
|---|---|
| RELATED ART | 70 |
| THIRD EXAMPLE | 90 |

# LEAKAGE DETERMINATION SYSTEM AND LEAKAGE DETERMINATION METHOD

CROSS REFERENCE TO RELATED APPLICATIONS

This application is a National Stage of International Application No. PCT/PCT/JP2014/005641, filed on Nov. 10, 2014, which claims priority from Japanese Patent Application No. 2013-233848, filed on Nov. 12, 2013, the contents of all of which are incorporated herein by reference in their entirety.

TECHNICAL FIELD

The present invention relates to a leakage determination system and a leakage determination method, and particularly relates to a leakage determination system and a leakage determination method for determining the presence or absence of fluid leakage in piping.

BACKGROUND ART

An infrastructure includes water supply and sewerage systems, high-pressure chemical pipelines, such as for gas and petroleum, large-scale facilities, such as high-speed railway networks, large constructions, such as long-span bridges and high-rise building, and transport equipment, such as large passenger aircrafts and automobiles. Piping is one of the important mechanisms among these facilities and equipment. A fluid, such as water, is passed through the piping. Therefore, if the piping is broken, it leads to fluid leakage. Consequently, it is necessary to instantaneously detect the leakage and repair the broken portion.

Thus, it is important to detect fluid leakage in piping as an initial action. Hereinafter, inspecting piping in order to detect fluid leakage in the piping is referred to as a leakage inspection.

A general leakage inspection is an audibility sensory inspection, in which a person catches leakage sounds. Meanwhile, in many cases, piping is installed underground or in high places. Therefore, a catching operation for the leakage sounds by a person involves a large amount of labor and risks. Thus, a technique for causing a dedicated device to perform a leakage inspection is proposed.

As one example of such a leakage inspection technique, PTL 1 describes a leakage detecting device. According to PTL 1, sounds detected around piping are converted to electric signals and the electric signals are analyzed, thereby detecting a leak. More specifically, the electric signals obtained from the acquired sounds are decomposed into different frequencies by use of a plurality of bandpass filters. Then, the amplitude of the electric signal at each frequency is compared with a threshold value. As a result, when the amplitude of the electric signal exceeds the threshold value for all of the plurality of signals, a determination is made that there is a leak.

CITATION LIST

Patent Literature

[PTL 1] Japanese Laid-open Patent Publication No. 62-055540

SUMMARY OF INVENTION

Technical Problem

However, in the related fluid leakage detecting device described in above-mentioned PTL 1, leakage vibration, which is the vibration caused by fluid leakage, changes as a flow state of a fluid in piping changes. As a result, in the fluid leakage detecting device described in above-mentioned PTL 1, there is a possibility that erroneous leakage determination occurs.

For example, in the related fluid leakage detecting device, in the case of performing leakage determination by monitoring a specific frequency range, the frequency having a characteristic peak waveform of the leakage vibration waveform may decrease as the pressure in piping decreases, and the peak waveform may sometimes deviate from the specific frequency range. From this reason, in the case of performing leakage determination by monitoring a specific frequency range, there are some cases that no characteristic peak waveform of the leakage vibration waveform is observed despite the occurrence of leakage and determination is made that there is no leak.

Further, in the related fluid leakage detecting device, in the case of performing leakage determination by providing a specific threshold value, the amplitude of leakage vibration may decrease as the pressure in piping decreases, and may sometimes fall below the specific threshold value. From this reason, in the case of performing leakage determination by providing a specific threshold value, there are some cases that determination is made that there is no leak despite the occurrence of leakage.

Thus, in the related fluid leakage detecting device, there is a problem that erroneous leakage determination may occur due to a change in a state of a fluid in piping.

The objective of the present invention is to provide a leakage determination system and a leakage determination method for solving the above-described problem that erroneous leakage determination may occur due to a change in a state of a fluid in piping.

Solution to Problem

A leakage determination system of the present invention includes a first detection means for detecting a prescribed physical quantity indicating a state of a fluid in piping, a second detection means for detecting vibration propagating through the piping, and a leakage determination means for performing leakage determination based on the physical quantity detected by the first detection means and the vibration detected by the second detection means.

The leakage determination method of the present invention includes detecting a physical quantity indicating a state of a fluid in piping, detecting vibration propagating through the piping, and performing leakage determination based on the physical quantity and the vibration.

Advantageous Effects of Invention

According to the leakage determination system and the leakage determination method of the present invention, erroneous leakage determination due to a change in a state of a fluid in piping can be reduced and the accuracy of leakage detection can be increased.

DESCRIPTION OF EMBODIMENTS

Exemplary embodiments and examples of the present invention are described below in detail with reference to the accompanying drawings.

Note that, in the following description, components having the same function are designated with the same reference numeral, and the description thereof may be omitted.

First Exemplary Embodiment

Figure 1:
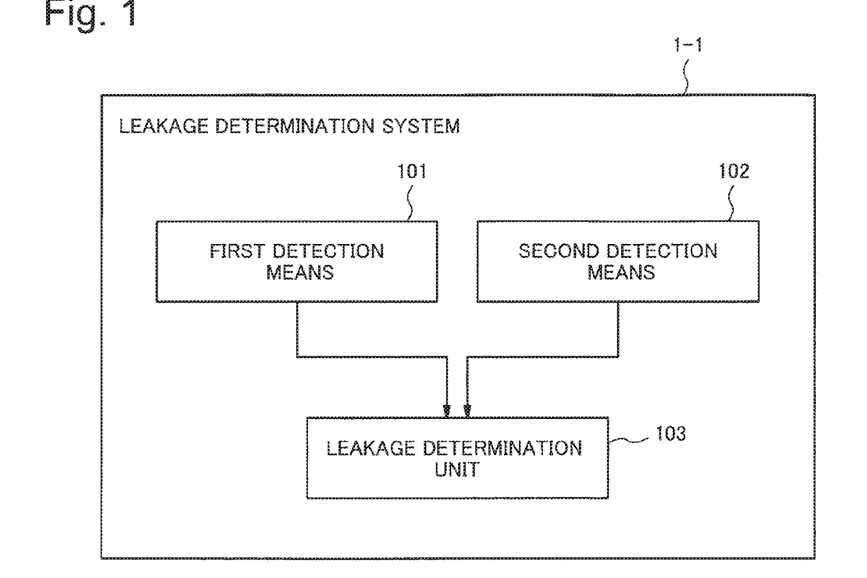
FIG. 1 is a block diagram illustrating a configuration of a first exemplary embodiment.

FIG. 1 is a block diagram illustrating a configuration of a first exemplary embodiment. As illustrated in FIG. 1, a leakage determination system 1-1 in the present exemplary embodiment includes at least a first detection means 101, a second detection means 102, and a leakage determination unit (leakage determination means) 103. The first detection means 101 and the second detection means 102 are communicatively connected to the leakage determination unit 103. Each of the components in FIG. 1 is described below.

The first detection means 101 detects a physical quantity indicating a state of a fluid in piping. As the physical quantity indicating a state of a fluid, for example, a pressure, a flow rate and a flow velocity indicating a flow state of a fluid, and a temperature of a fluid are exemplified. As the first detection means 101, for example, a pressure measurement device, a flow rate measurement device, and a flow velocity measurement device are exemplified. In the following, a case in which a pressure indicating a flow state of a fluid is measured as the physical quantity indicating a state of a fluid will be mainly described, but the present exemplary embodiment is not limited thereto and other physical quantities as described above may be used.

The second detection means 102 detects vibration propagating through piping. The term vibration herein refers to, for example, vibration acceleration, vibration velocity, and vibration displacement. As the second detection means 102, for example, a vibration acceleration sensor 702, a vibration velocity sensor, and a vibration displacement sensor are exemplified.

The second detection means 102 preferably is of a high sensitivity and capable of detecting signals across a wide frequency range. For example, it is preferred that the vibration acceleration sensor 702 be a piezoelectric vibration sensor with a signal amplifier circuit embedded therein. Further, as the second detection means 102, for example, a contact-type detection means to be installed in piping may be used. The second detection means 102 may be installed, without particular limitation on the installation location in piping, at an appropriate location in piping depending on use applications of the leakage determination system 1-1.

Further, as the second detection means 102, a contactless-type detection means, which is installable away from piping, may also be used. The contactless-type detection means is effective in the case when the weight of the detection means itself has a large influence on vibration of piping when the detection means is mounted thereon, such as when detecting vibration of light-weight piping, for example. Installing the second detection means 102 of a contactless type away from piping can prevent the weight of the second detection means 102 itself from having an influence on the vibration of the piping. Further, the contactless-type detection means is also effective in the case where it is difficult to mount a detection means on piping, such as when detecting vibration of piping through which a high-temperature fluid flows.

The leakage determination unit 103 is intended to set a leakage determination condition and determine the presence or absence of fluid leakage in piping. As the leakage determination condition, for example, a frequency range to be monitored in leakage determination and a leakage determination threshold value of vibration amplitude are exemplified. Further, as the determination of the presence or absence of leakage, for example, extracting a feature value from the detected values detected by the vibration detection means 102 and comparing the feature value with a leakage determination threshold value in accordance with the leakage determination condition are exemplified. If the feature value is greater than the leakage determination threshold value, determination is made that there is a leak. As the feature value, for example, vibration amplitude of vibration and resonance sharpness Q value of vibration are exemplified. The term resonance sharpness Q value herein refers to a value calculated using Eq. (1) as follows. In Eq. (1), f represents a frequency of vibration that resonates piping (natural vibration frequency of piping), and Δf represents a full width at half maximum of the amplitude frequency characteristics of vibration propagating through piping.

$$Q = \frac{f}{\Delta f} \qquad \text{Eq. (1)}$$

Next, the setting of a leakage determination condition is described in detail.

The leakage determination unit 103 sets a leakage determination condition in consideration of a physical quantity indicating a state of a fluid in piping detected by the first detection means 101. The term setting of a leakage determination condition in consideration of a physical quantity refers to changing and setting the leakage determination condition, such as a frequency range to be monitored in leakage determination and a leakage determination threshold value of vibration amplitude, depending on the physical quantity. Further, the leakage determination unit 103 may be configured to calculate and set the leakage determination condition using a calculation equation as will be described later from the physical quantity indicating a state of a fluid in piping detected by the first detection means 101. Further, the leakage determination unit 103 may be configured to read and set, referring to previously prepared data, the leakage determination condition depending on the physical quantity. The term data refers to a table indicating correspondence between a physical quantity and a feature value of vibration.

(Leakage Determination Method)

Figure 2:
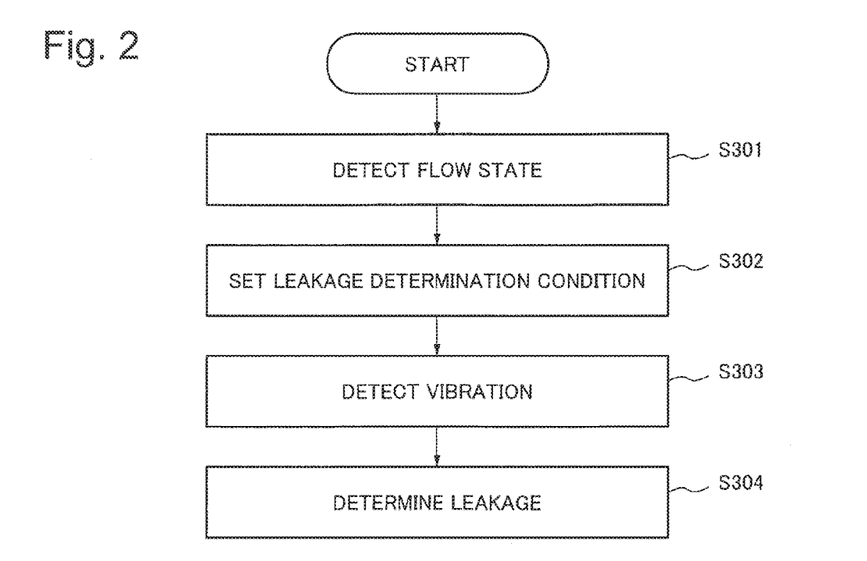
FIG. 2 is a flowchart illustrating a leakage determination method in the exemplary embodiment.

FIG. 2 is a flowchart illustrating a leakage determination method in the exemplary embodiment. As illustrated in FIG. 2, the leakage determination method in the present exemplary embodiment includes at least a flow state detecting step S301, a leakage determination condition setting step S302, a vibration detecting step S303, and a leakage determining step S304.

In the flow state detecting step S301, the first detection means 101 detects a physical quantity indicating a state of a fluid in piping.

In the leakage determination condition setting step S302, the leakage determination unit 103 sets a leakage determination condition using the physical quantity detected by the first detection means 101 in the flow state detecting step S301. For example, a frequency range to be monitored for preforming leakage determination or a leakage determination threshold value is calculated from the physical quantity indicating a state of a fluid in piping detected in the flow state detecting step S301.

Assume that X represents the physical quantity indicating a state of a fluid in piping detected in the flow state detecting step S301 and f represents the center frequency of a frequency range to be monitored for leakage determination. In this case, the center frequency f can be expressed as a polynomial of the physical quantity X. An example of the polynomial is given in Eq. (2). In Eq. (2), a0, a1, a2, and a3 are coefficients (parameters) for calculating the frequency f, and are constants that can be determined according to a material, a shape, or the like of piping. A frequency range to be monitored can be determined by separately setting a bandwidth with the frequency f calculated from Eq. (2) used as the center frequency.

$$f = a_0 + a_1 \cdot X + a_2 \cdot X^2 + a_3 \cdot X^3 \qquad \text{Eq. (2)}$$

In the leakage determination condition setting step S302, may be configured such that filtering process is performed in order to extract a signal in the determined frequency range to be monitored using the signals detected by the second detection means 102. In this case, based on the frequency range to be monitored, a parameter for filtering process is calculated and set.

For example, as a leakage determination threshold value A for determining leakage, a value A can be used that is calculated by the following method. Assume that vibration amplitude of fluid leakage is proportional to a flow velocity of a fluid in piping. In this case, in accordance with Bernoulli's theorem, the flow velocity v is substantially proportional to a square root of a pressure P. Therefore, the leakage determination threshold value A can be calculated from Eq. (3) using the pressure P. Accordingly, by detecting the pressure in piping by the first detection means 101, it is possible to calculate the leakage determination threshold value A. In Eq. (3), b0 and b1 are coefficients (parameters) and are constants that can be determined according to a material, a shape, or the like of piping.

$$A = b_0 + b_1 \cdot P^{\frac{1}{2}}. \qquad \text{Eq. (3)}$$

Next, in the vibration detecting step S303, the second detection means 102 detects vibration propagating through piping.

In the leakage determining step S304, the leakage determination unit 103 determines fluid leakage using the leakage determination condition set in the leakage determination condition setting step S302 and a detected value detected in the vibration detecting step S303. For example, a feature value is extracted from the detected value and the feature value is compared with the leakage determination threshold value, which is the leakage determination condition. If the feature value is greater than the leakage determination threshold value, a determination is made that there is a leak.

According to the configuration as described above, in the present exemplary embodiment, it becomes possible to perform leakage determination in consideration of a state of a fluid in piping. Thus, in the present exemplary embodiment, when performing leakage determination by monitoring a specific frequency range, a leakage determination condition is set based on the pressure in piping, and therefore it becomes possible to prevent a peak waveform from deviating from the specific frequency range. As a result, erroneous determination can be reduced and the accuracy of leakage detection can be increased.

Figure 3:
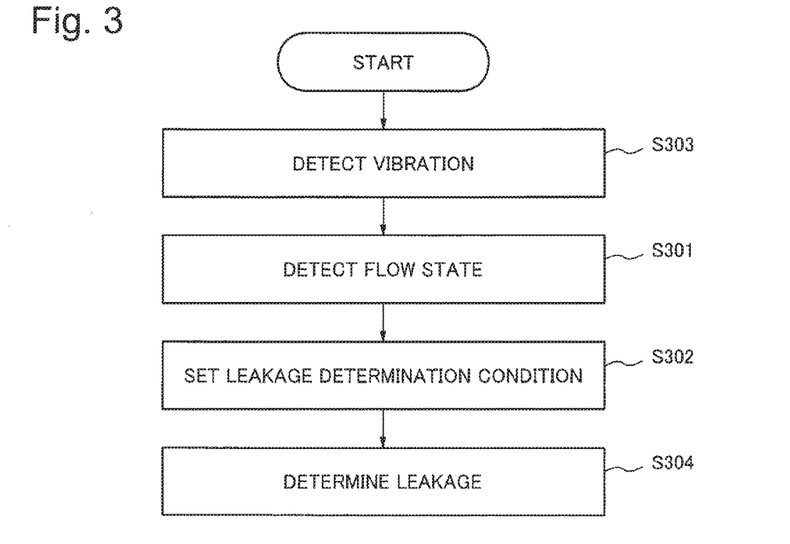
FIG. 3 is a flowchart illustrating another operation of the exemplary embodiment.
Figure 4:
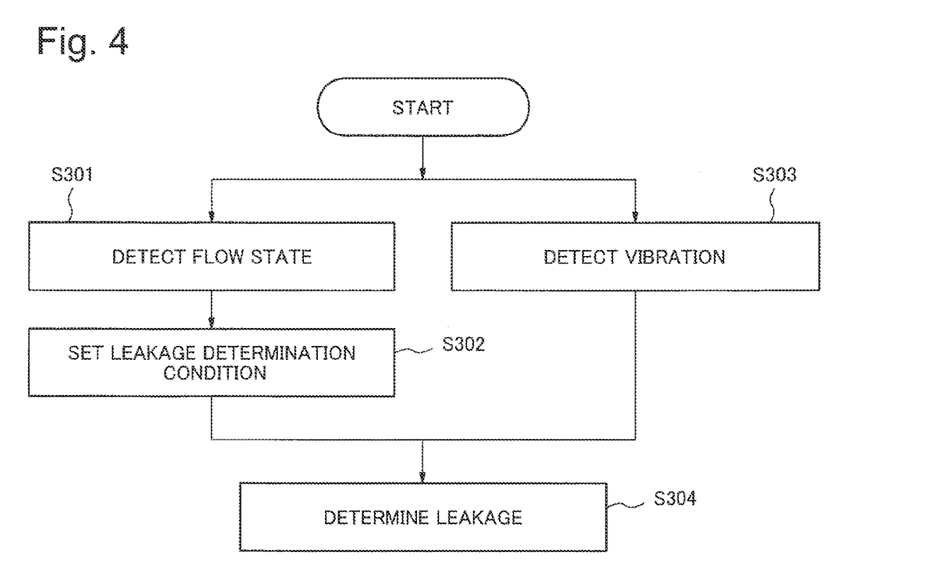
FIG. 4 is a flowchart illustrating further another operation of the exemplary embodiment.
Figure 5:
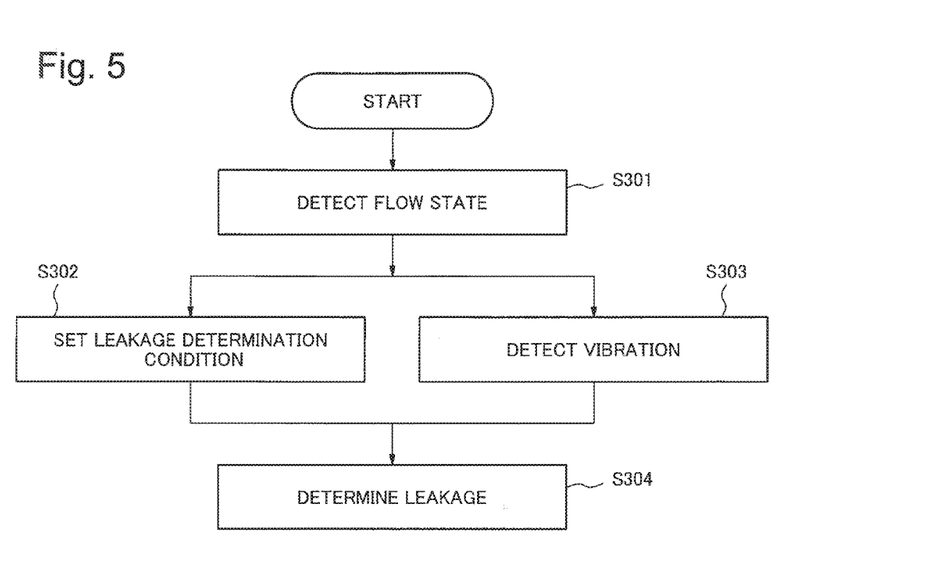
FIG. 5 is a flowchart illustrating still another operation of the exemplary embodiment.

In the present exemplary embodiment, the order of the flow state detecting step S301, the leakage determination condition setting step S302, and the vibration detecting step S303 may be different from the order illustrated in FIG. 2. For example, as illustrated in FIG. 3, the vibration detecting step S303 may be performed first, then the flow state detecting step S301 may be performed, and thereafter the leakage determination condition setting step S302 may be performed. Further, as illustrated in FIG. 4, the vibration detecting step S303 may be performed in parallel with the flow state detecting step S301 and the leakage determination condition setting step S302. Further, as illustrated in FIG. 5, the flow state detecting step S301 may be performed first, and the vibration detecting step S303 and the leakage determination condition setting step S302 may be performed in parallel. Any of the methods have an effect equivalent to that of the leakage determination method according to the present exemplary embodiment.

Further, a plurality of frequency ranges to be monitored may be set. Specifically, in the leakage determination condition setting step S302, a plurality of frequency ranges to be monitored are set. In the vibration detecting step S303, vibration propagating through piping is detected with respect to the plurality of frequency ranges. In the leakage determination condition setting step S304, fluid leakage is determined with respect to each of the frequency ranges and a plurality of results of determination are integrated to perform overall determination. In this manner, the accuracy of leakage detection is improved.

Figure 6:
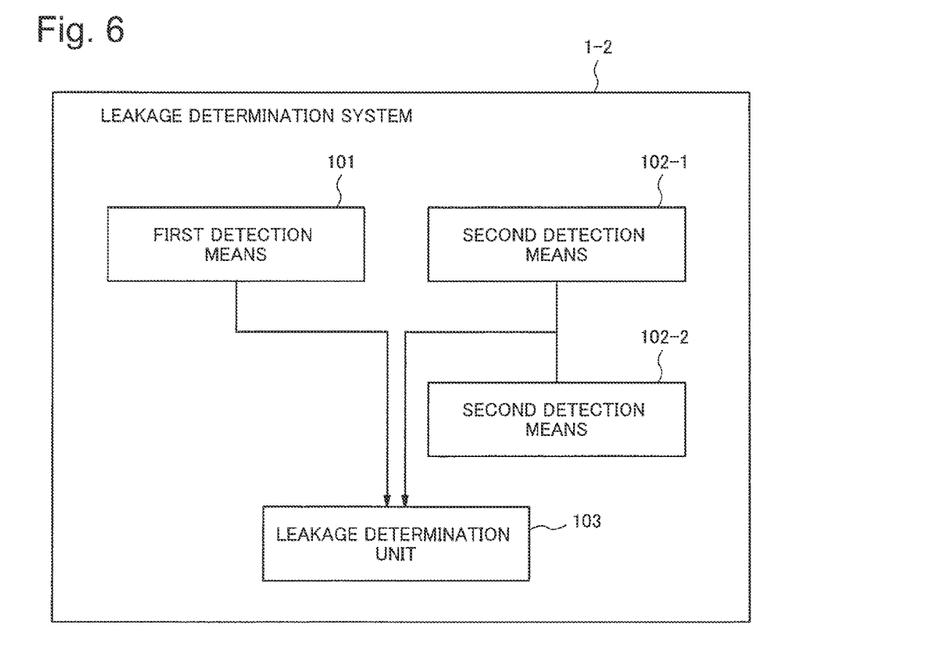
FIG. 6 is a block diagram illustrating another configuration of the first exemplary embodiment.

FIG. 6 is a block diagram illustrating another configuration of the first exemplary embodiment. As illustrated in FIG. 6, a leakage determination system 1-2 in the present exemplary embodiment includes a plurality of second detection means (102-1, 102-2) each installed in piping at different locations, for example. By adopting a configuration in which leakage determination is performed individually using detected values detected by the plurality of second detection means (102-1, 102-2), and results of leakage determination are statistically processed to perform overall determination, an effect of improving the accuracy of leakage detection and reducing erroneous determination can be expected. Further, by analyzing the correlation between positions of the plurality of second detection means (102-1, 102-2) installed at different locations and feature quantities of vibrations detected by the plurality of second detection means (102-1, 102-2), it is possible to specify a leakage occurrence point, for example. In regard to the analysis, configuration may be made such that, for example, the leakage determination unit 103 performs the analysis, or, alternatively, such that a processing unit for performing the analysis is further included.

Second Exemplary Embodiment

Figure 7:
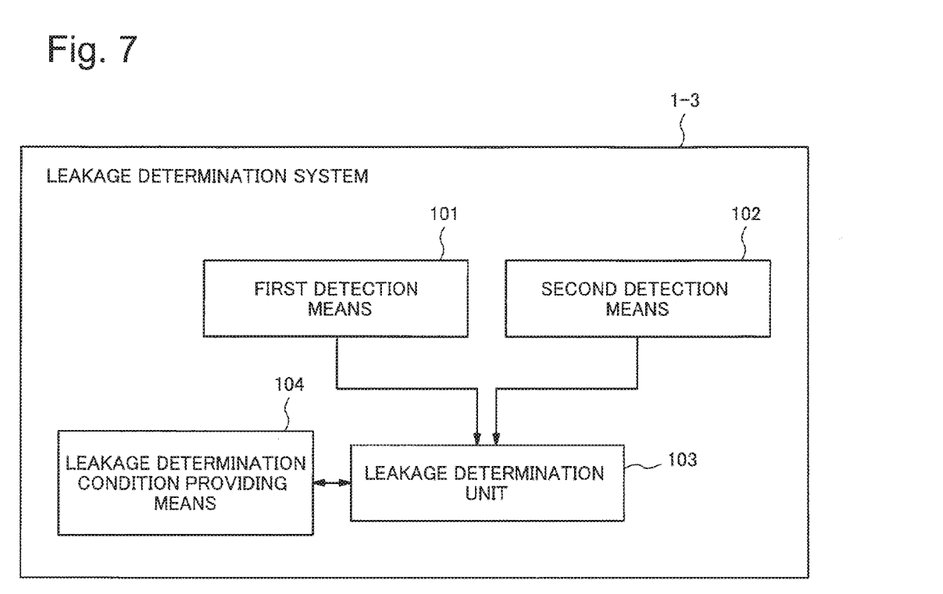
FIG. 7 is a block diagram illustrating a configuration of a second exemplary embodiment.

FIG. 7 is a block diagram illustrating a configuration of a second exemplary embodiment. As illustrated in FIG. 7, in the present exemplary embodiment, a leakage determination condition providing means 104 is included. The objective of the leakage determination condition providing means 104 is to provide the leakage determination unit 103 with a leakage determination condition corresponding to a physical quantity detected by a first detection means 101. As the leakage determination condition providing means 104, for example, a data storage means is exemplified.

First, the leakage determination condition providing means 104 stores in advance a table illustrating the correspondence between a physical quantity and a feature value of vibration. Then, the leakage determination unit 103 acquires a physical quantity in piping by means of the first detection means 101. Next, the leakage determination unit 103 reads out a leakage determination condition corresponding to the physical quantity from the leakage determination condition providing means 104. Then, the leakage determination unit 103 sets the leakage determination condition based on the detected physical quantity.

Such a configuration using the leakage determination condition providing means 104 makes it possible to set a leakage determination condition without performing calculation relating to leakage determination. Therefore, a leakage determination condition can be set quickly. Further, since no calculation for a leakage determination condition is performed, power consumed in an entire leakage determination system 1-3 can be suppressed.

The leakage determination condition providing means 104 may be configured as a data storage means in a distant position wirelessly communicating with the leakage determination unit 103. When configured as such, the leakage determination condition providing means 104 can be separated to be carried. Therefore, maintenance of the leakage determination condition providing means 104 is facilitated.

Further, the leakage determination condition providing means 104 can be also shared among a plurality of leakage determination systems 1-3. When configured as such, a table of correspondence between a physical quantity and a leakage determination condition for the plurality of leakage determination systems 1-3 can be changed collectively.

Next, the result of confirmation for the leakage determination method with use of an experimental system for measuring leakage vibration.

Figure 8:
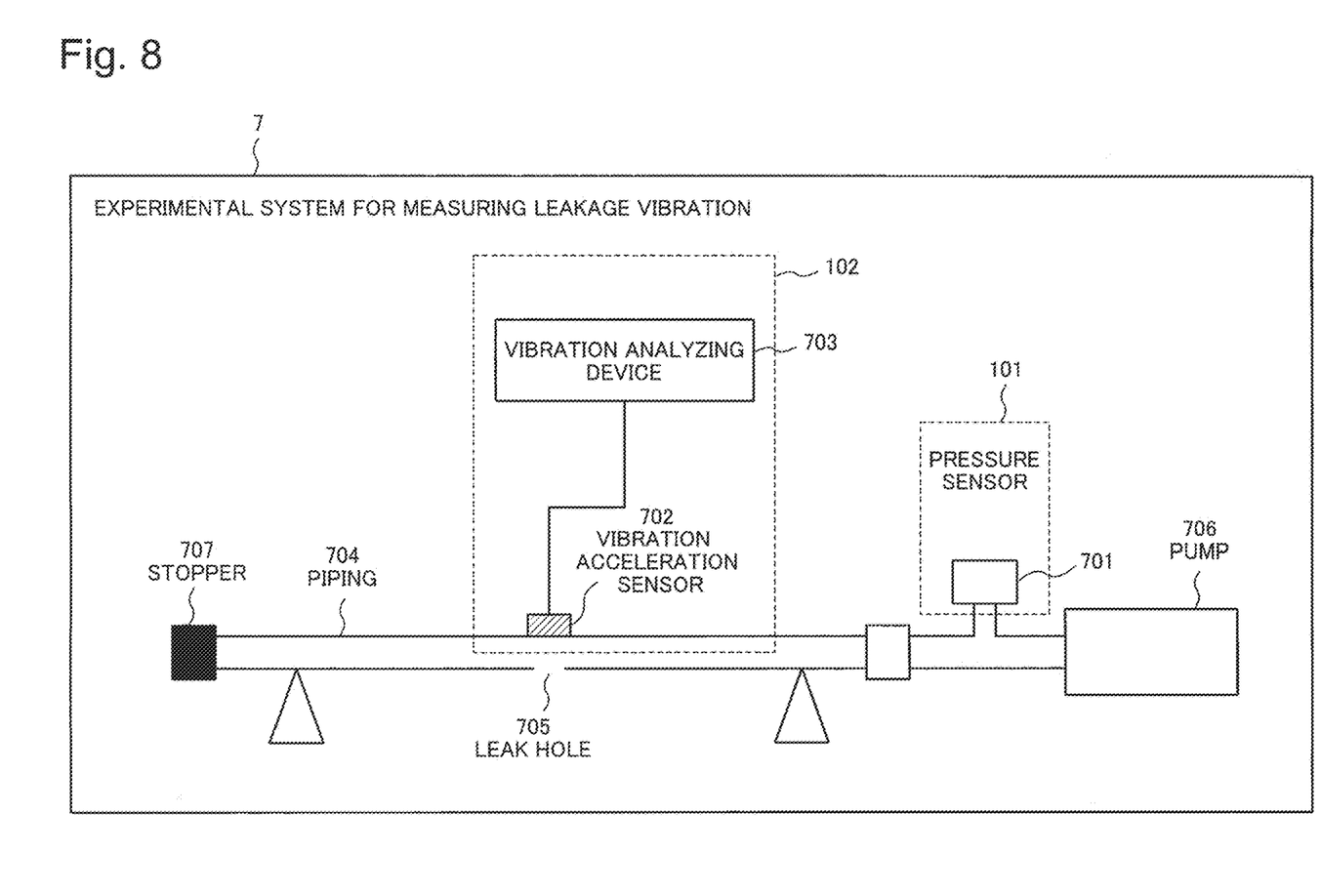
FIG. 8 is diagram illustrating a configuration of an experimental system for measuring leakage vibration.

FIG. 8 is diagram illustrating a configuration of an experimental system for measuring leakage vibration. As illustrated in FIG. 8, an experimental system 7 for measuring leakage vibration includes at least a pressure sensor 701, a vibration acceleration sensor 702, a vibration analyzing device 703, a piping 704, a leak hole 705, a pump 706, and a stopper 707. As the piping 704, for example, a metal pipe is exemplified.

The pressure sensor 701 corresponds to the first detection means 101. Further, the vibration acceleration sensor 702 and the vibration analyzing device 703 correspond to the second detection means 102. Although it is not illustrated in FIG. 8, the leakage determination unit 103, which performs data communications with the pressure sensor 701, the vibration acceleration sensor 702 and the vibration analyzing device 703 to determine the presence or absence of fluid leakage, and the leakage determination condition providing means 104, which stores a previously prepared table indicating correspondence between a physical quantity and a leakage determination condition, are included.

In the experiment, an investigation was made into the correlation, in a case where a fluid leaks through the leak hole 705 provided on the piping 704, between a pressure (water pressure) in the piping 704 and vibration caused by the leakage.

As the piping 704, a metal pipe having a length of 500 mm, an outer diameter of 7.2 mm, and an inner diameter of 6.0 mm was used. The leak hole 705 having a diameter of 1 mm was provided at a position 250 mm away from the end in the length direction of the piping 704. The piping 704 was configured such that the opposite ends of the piping 704 were supported.

The detection of values of water pressure in the piping 704 was performed by the pressure sensor 701 connected to the piping 704. Further, the detection of vibration caused by the leakage was performed by the vibration acceleration sensor 702 installed on the piping 704 opposite to the leak hole 705. At the vibration acceleration sensor 702, voltage outputs proportional to the vibration amplitude of the piping 704 near the leak hole 705 were detected. The vibration analyzing device 703 is further connected to the vibration acceleration sensor 702 installed in the piping 704.

The experiment was performed by making the water pressure in the piping 704 constant by the pump 706 and thereafter leaking the water through the leak hole 705.

First Example

Using the experimental system 7 for measuring leakage vibration, an investigation was made into the correlation between the water pressure in the piping 704 at the time of occurrence of leakage and the frequency characteristics of vibration caused by the leakage, by analyzing vibration frequency characteristics of the piping 704 by the vibration analyzing device 703.

At the event of leakage, a characteristic peak waveform was seen in the frequency domain in the vibration waveform attributable to the leakage. Hereinafter, a frequency in which the characteristic peak waveform was observed is called to as a peak frequency.

Figure 9:
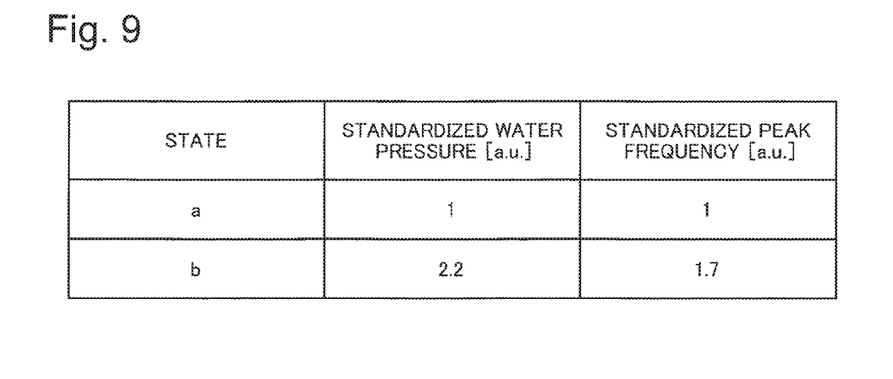
FIG. 9 is a chart illustrating the correlation between a water pressure and a peak frequency in a first example.

FIG. 9 is a chart illustrating the correlation between a water pressure and a peak frequency in the first example. Note that the water pressure is expressed as a pressure difference from the atmospheric pressure. Further, the water pressure and the peak frequency are expressed as standardized values with the numerical values in the state a as reference. In the state b, the water pressure resulted in 2.2 times as compared to the case in the state a. At this time, the peak frequency resulted in 1.7 times, which increased by 70%. In other words, it was confirmed that the peak frequency changes depending on the water pressure.

In the following, focusing on the changes in the peak frequency of leakage vibration due to the changes in the water pressure, a comparison is made between the leakage detection rate in a related leakage determination method not taking into consideration of the changes in the peak frequency due to the changes in the water pressure, and the leakage detection rate in the leakage determination method of the present example, i.e., the leakage determination method taking into consideration of the changes in the peak frequency due to the changes in the water pressure. The term leakage detection rate herein refers to the probability of determining that there is a leak in the event of leakage.

As the related leakage determination method not taking into consideration of the changes in the peak frequency due to the changes in the water pressure, leakage determination was performed such that a frequency range to be monitored in the leakage determination is fixed in advance regardless of the changes in the peak frequency due to the changes in the water pressure. Hereinafter, the frequency range to be monitored in the leakage determination is called to as a monitored frequency range.

Figure 10:
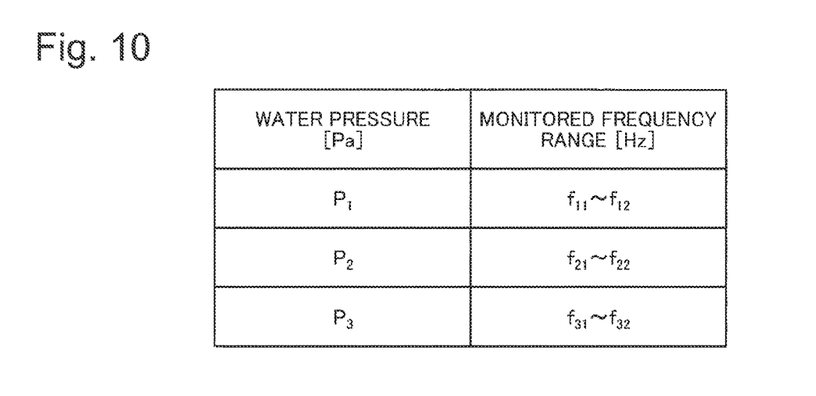
FIG. 10 is a table of correspondence between a water pressure and a monitored frequency range in the first example.

Further, as the leakage determination method of the present example, leakage determination is performed such that a table of correspondence between a water pressure and a monitored frequency range is prepared for taking into consideration of the frequency changes due to the changes in the water pressure, and the monitored frequency range is determined on the basis of the changes in the water pressure with reference to the table of correspondence. FIG. 10 is a table of correspondence between a water pressure and a monitored frequency range in the first example.

Figure 11:
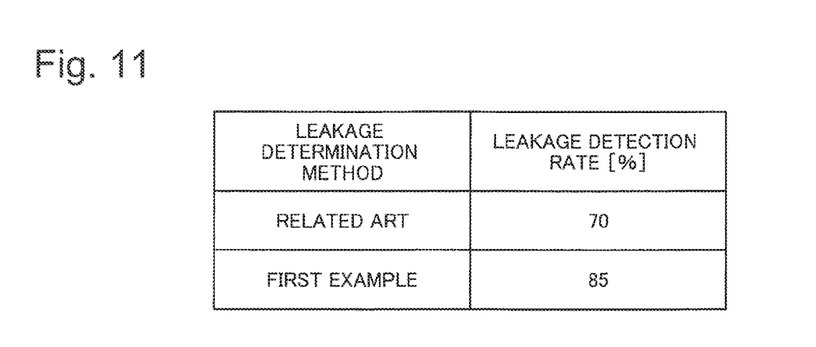
FIG. 11 is a table of correspondence between a leakage detection rate in a related art and that in the first example.

FIG. 11 is a table of correspondence between a leakage detection rate in a related art and that in the first example. As the result of the experiment, the leakage detection rate was 70% in the leakage determination method not taking into consideration of the changes in the peak frequency due to the changes in the water pressure, whereas the leakage detection rate was 85% in the leakage determination method of the present example. In other words, the leakage detection rate was improved. Consequently, it was confirmed that, by use of the leakage determination method of the present example, the accuracy of leakage detection can be increased by following the changes in the peak frequency due to the changes in the water pressure.

Advantageous Effects

In the leakage determination method of the present example, a frequency range to be monitored is changed and set on the basis of the water pressure. This enables highly accurate leakage detection even if the peak frequency in leakage vibration changes due to the changes in the water pressure.

Second Example

Using the experimental system 7 for measuring leakage vibration, an investigation was made into the changes in the water pressure in the piping 704 at the time of occurrence of leakage and the changes in amplitude of vibration caused by the leakage, by analyzing the amplitude of vibration of the piping 704 by the vibration analyzing device 703.

At the event of leakage, a characteristic peak waveform was seen in the frequency domain in the vibration waveform attributable to the leakage. Hereinafter, the amplitude at the peak frequency of the vibration waveform in the frequency domain is called to as vibration amplitude.

Figure 12:
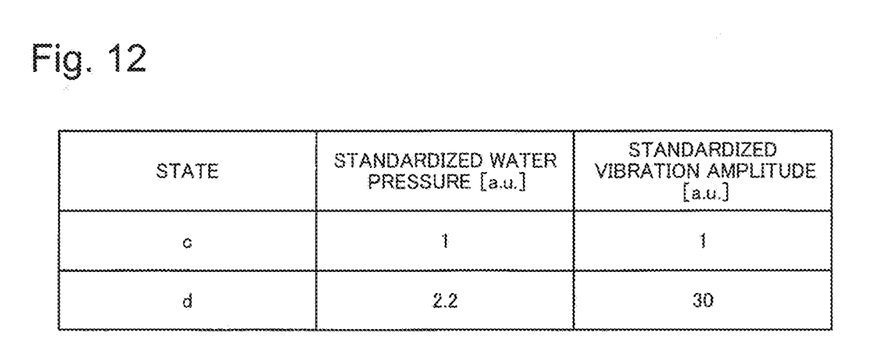
FIG. 12 is a correlation between a water pressure and a value of vibration amplitude in a second example.

FIG. 12 is the correlation between a water pressure and a value of vibration amplitude in the second example. The water pressure herein represents a pressure difference from the atmospheric pressure. Further, the water pressure and the vibration amplitude represent standardized values with the numerical values in the state c as reference. As illustrated in FIG. 12, in the state d, when the water pressure resulted in 2.2 times as compared to the case in the state c, the vibration amplitude resulted in an increase of 30 times. In other words, it was confirmed that the vibration amplitude changes depending on the water pressure.

In the following, focusing on the changes in the vibration amplitude due to the changes in the water pressure, a comparison is made between the leakage detection rate in a related leakage determination method not taking into consideration of the changes in the vibration amplitude due to the changes in the water pressure, and the leakage detection rate in the leakage determination method of the present example, i.e., the leakage determination method taking into consideration of the changes in the vibration amplitude due to the changes in the water pressure to perform leakage determination.

As the related leakage determination method not taking into consideration of the changes in the vibration amplitude due to the changes in the water pressure, leakage determination is performed such that a threshold value to be used for the leakage determination is fixed in advance regardless of the amplitude changes due to the changes in the water pressure. Hereinafter, the threshold value to be used for the leakage determination is called to as a leakage determination threshold value.

Figure 13:
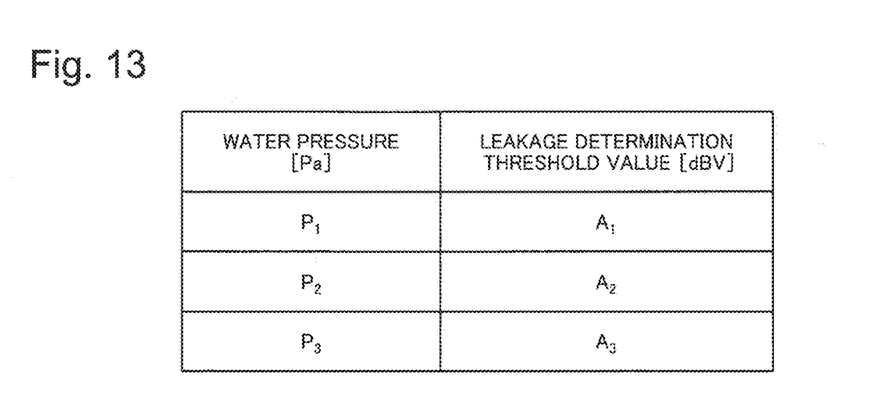
FIG. 13 is a table of correspondence between a water pressure and a leakage determination threshold value in the second example.

Further, as the leakage determination method of the present example, leakage determination is performed such that a table of correspondence between a water pressure and a leakage determination threshold value is prepared for taking into consideration of the amplitude changes due to the changes in the water pressure, and the leakage determination threshold value is determined on the basis of the changes in the water pressure with reference to the table of correspondence. FIG. 13 is a table of correspondence between a water pressure and a leakage determination threshold value in the second example. In FIG. 13, the unit of the leakage determination threshold value is dBV, with 1 V as reference. Hereinafter, 1 V is used as reference of the unit dBV.

Figure 14:
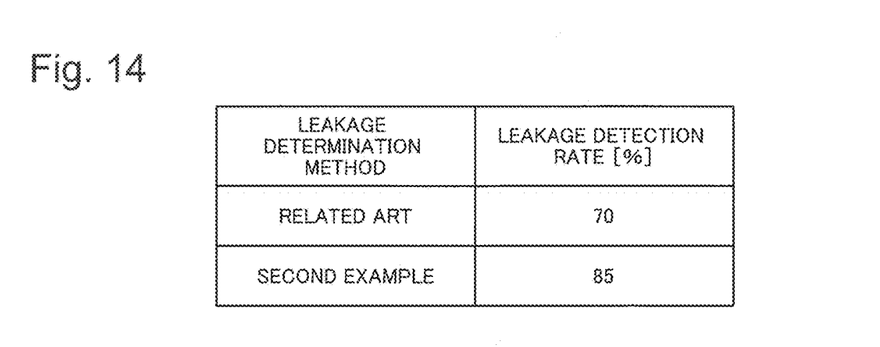
FIG. 14 is a table of correspondence between a leakage detection rate in a related art and that in the second example.

FIG. 14 is a table of correspondence between a leakage detection rate in a related art and that in the second example. The leakage detection rate was 70% in the related leakage determination method not taking into consideration of the changes in the vibration amplitude due to the changes in the water pressure, whereas the leakage detection rate was 85% in the leakage determination method of the present example. In other words, the leakage detection rate was improved. Consequently, it was confirmed that, by use of the leakage determination method of the present example, the accuracy of leakage detection can be increased by following the changes in the amplitude of leakage vibration due to the changes in the water pressure.

Advantageous Effects

In the leakage determination method of the present example, a leakage determination threshold value is changed and set on the basis of the water pressure. This enables highly accurate leakage detection even if the amplitude of leakage vibration changes due to the changes in the water pressure.

Third Example

As described above, the peak frequency of the waveform of leakage vibration and the vibration amplitude changed on the basis of the water pressure in the piping. In the following, a comparison is made between the leakage detection rate in a related leakage determination method not taking into consideration of the changes in the leakage vibration due to the changes in the water pressure, and the leakage detection rate in the leakage determination method of the present example, i.e., the leakage determination method taking into consideration of the changes in the peak frequency and the changes in the vibration amplitude due to the changes in the water pressure.

As the related leakage determination method not taking into consideration of the changes in the leakage vibration due to the changes in the water pressure, leakage determination is performed such that two leakage determination conditions, i.e., a monitored frequency range and a leakage determination threshold value are fixed in advance.

Figure 15:
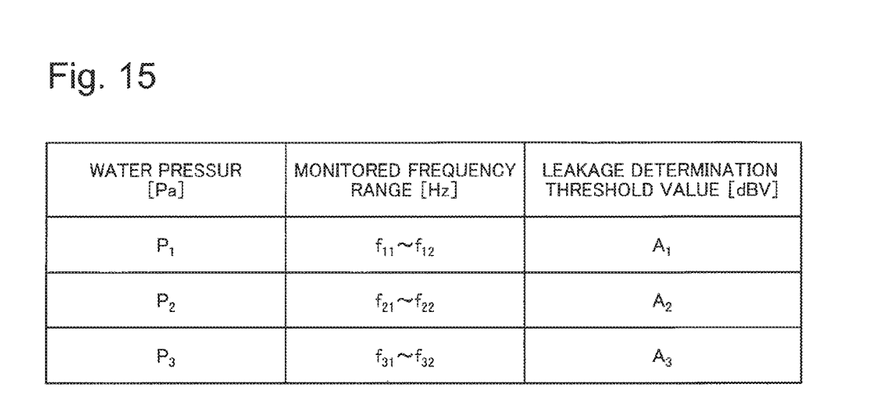
FIG. 15 is a table of correspondence among a water pressure, a monitored frequency range, and a leakage determination threshold value in a third example.

Further, as the leakage determination method of the present example, leakage determination is performed such that two leakage determination conditions, i.e., a monitored frequency range and a leakage determination threshold value are set on the basis of the changes in the water pressure. Leakage determination is performed such that a table of correspondence among a water pressure, a monitored frequency range and a leakage determination threshold value is prepared for taking into consideration of the changes in leakage vibration due to the changes in the water pressure to determine the monitored frequency range and the leakage determination threshold value. FIG. 15 is a table of correspondence among a water pressure, a monitored frequency range, and a leakage determination threshold value in the third example.

Figure 16:
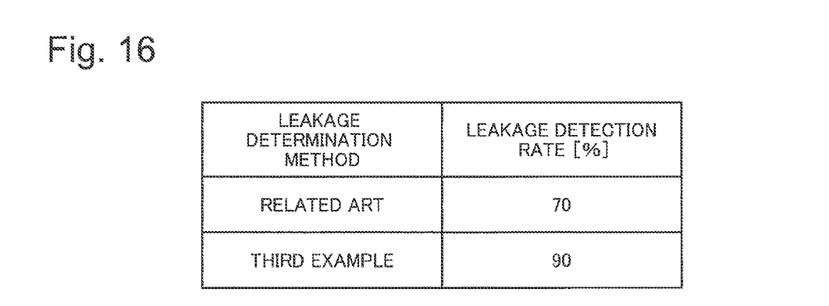
FIG. 16 is a table of correspondence between a leakage detection rate in a related art and that in the third example.

FIG. 16 is a table of correspondence between a leakage detection rate in a related art and that in the third example. The leakage detection rate was 70% in the related leakage determination method not taking into consideration of the changes in leakage vibration due to the changes in the water pressure, whereas the leakage detection rate was 90% in the leakage determination method of the present example. In other words, the leakage detection rate was improved. Consequently, it was confirmed that, by use of the leakage determination method of the present example, the accuracy of leakage detection can be increased by following the changes in leakage vibration due to the changes in the water pressure.

Advantageous Effects

In the leakage determination method of the present example, two leakage determination conditions, i.e., a monitored frequency range and a leakage determination threshold value are changed and set to the changes in fluid pressure. Thereby, the accuracy of leakage detection can be increased.

The present invention is not limited to the above-described exemplary embodiments and examples, and may be modified in various ways as far as such modifications are within the scope of the invention defined in the claims. It is needless to say that such modifications are in the scope of the present invention.

A part or all of the above-described exemplary embodiments and examples can be described as the following Supplementary notes but the present invention is not limited to the following.

(Supplementary Note 1)

A leakage determination system including:

a first detection means for detecting a prescribed physical quantity indicating a state of a fluid in piping;

a second detection means for detecting vibration propagating through the piping; and a leakage determination means for performing leakage determination based on the physical quantity detected by the first detection means and the vibration detected by the second detection means.

(Supplementary note 2)

The leakage determination system according to Supplementary note 1, wherein the leakage determination means compares a determination condition to be set based on the physical quantity detected by the first detection means with a feature value of the vibration detected by the second detection means, and determines that there is a leak when the feature value exceeds a threshold value in the determination condition.

(Supplementary Note 3)

The leakage determination system according to Supplementary note 2, wherein the determination condition includes at least one of a frequency range to be monitored by the second detection means and a vibration amplitude.

(Supplementary Note 4)

The leakage determination system according to Supplementary note 2 or 3, wherein the leakage determination means sets the determination condition using a calculation equation for defining the feature value of the vibration.

(Supplementary Note 5)

The leakage determination system according to Supplementary note 2 or 3, further including a leakage determination condition providing means for storing the physical quantity to be detected by the first detection means and the feature value of the vibration in association with each other, wherein the leakage determination means sets the determination condition using the association provided by the leakage determination condition providing means.

(Supplementary Note 6)

The leakage determination system according to any one of Supplementary notes 1 to 5, the system including a plurality of the second detection means, wherein the leakage determination means performs leakage determination based on the first detection means and vibrations detected by the plurality of second detection means.

(Supplementary Note 7)

The leakage determination system according to Supplementary note 6, wherein the plurality of second detection means are installed at different locations near the piping.

(Supplementary Note 8)

The leakage determination system according to Supplementary note 6 or 7, wherein the leakage determination means specifies a leak point from a correlation between positions of the plurality of second detection means and feature quantities of the vibrations detected by the respective second detection means.

(Supplementary Note 9)

The leakage determination system according to any one of Supplementary notes to 1 to 8, wherein the prescribed physical quantity is a pressure of the fluid in the piping.

(Supplementary Note 10)

The leakage determination system according to any one of Supplementary notes 1 to 8, wherein the prescribed physical quantity is a flow rate of the fluid in the piping.

(Supplementary Note 11)

The leakage determination system according to any one of Supplementary notes 1 to 8, wherein the prescribed physical quantity is a flow velocity of the fluid in the piping.

(Supplementary Note 12)

The fluid leakage determination system according to any one of Supplementary notes 1 to 11, wherein the second detection means is a contact-type vibration detection means.

(Supplementary Note 13)

The fluid leakage determination system according to Supplementary note 12, wherein the second detection means is a piezoelectric vibration sensor.

(Supplementary Note 14)

The leakage determination system according to any one of Supplementary notes 1 to 9, wherein the second detection means is a contactless-type vibration detection means.

(Supplementary Note 15)

A leakage determination method including:

detecting a physical quantity indicating a state of a fluid in piping;

detecting vibration propagating through the piping; and performing leakage determination based on the physical quantity and the vibration.

(Supplementary Note 16)

The leakage determination method according to Supplementary note 15, including:

comparing a determination condition to be set based on the physical quantity with a feature value of the vibration; and determining that there is a leak when the feature value exceeds a threshold value in the determination condition.

(Supplementary Note 17)

The leakage determination method according to Supplementary note 16, wherein the determination condition includes at least one of a frequency range to be monitored, and a vibration amplitude.

(Supplementary Note 18)

The leakage determination method according to any one of Supplementary notes 16 and 17, including setting the determination condition using a calculation equation for defining the feature value of the vibration based on the physical quantity.

(Supplementary Note 19)

The leakage determination method according to any one of Supplementary notes 16 and 17, including:

storing the physical quantity to be detected by the first detection means and the feature value of the vibration in association with each other; and setting the determination condition using the association.

(Supplementary Note 20)

The leakage determination method according to any one of Supplementary notes 15 to 19, wherein the physical quantity is a pressure in the piping.

(Supplementary Note 21)

The leakage determination method according to any one of Supplementary notes 15 to 19, wherein the physical quantity is a flow rate in the piping.

(Supplementary Note 22)

The leakage determination method according to any one of Supplementary notes 15 to 19, wherein the physical quantity is a flow velocity in the piping.

In the above, the invention of the present application is described with reference to the exemplary embodiments (and examples), but the invention of the present application is not limited to the above-described exemplary embodiments (and examples). Various modifications that are apparent to those skilled in the art can be made to the configurations and details of the present invention within the scope of the present invention.

This application is based upon and claims the benefit of priority from Japanese patent application No. 2013-233848, filed on Nov. 12, 2013, the disclosure of which is incorporated herein in its entirety by reference.

REFERENCE SIGNS LIST

1-1, 1-2, 1-3 Leakage determination system
7 Experimental system for measuring leakage vibration
101 First detection means
102, 102-1, 102-2 Second detection means
103 Leakage determination unit
104 Leakage determination condition providing means
S301 Flow state detecting step
S302 Leakage determination condition setting step
S303 Vibration detecting step
S304 Leakage determining step
701 Pressure sensor
702 Vibration acceleration sensor
703 Vibration analyzing device
704 Piping
705 Leak hole
706 Pump
707 Stopper

The invention claimed is:

1. A leakage determination system comprising:
    a fluid state detector;
    a memory configured to store a physical quantity and a feature value of vibration in association with each other;
    a vibration detector; and
    a processor configured to:
    detect a leakage of piping based on vibration detected by the vibration detector that detects vibration propagating through the piping and a physical quantity indicating a state of fluid in the piping detected by the fluid state detector;
    determine a threshold value corresponding to the physical quantity detected by the fluid state detector,
    detect the leakage of the piping when a feature value of the vibration detected by the vibration detector exceeds the threshold value; and
    determine the threshold value stored by the memory.

2. A leakage determination system comprising:
    a fluid state detector;
    a vibration detector; and
    a processor configured to
    detect a leakage of piping based on vibration detected by the vibration detector that detects vibration propagating through the piping and a physical quantity indicating a state of fluid in the piping detected by the fluid state detector;
    determine a frequency range corresponding to the physical quantity detected by the fluid state detector, and
    detect the leakage of the piping based on the vibration with respect to the frequency range detected by the vibration detector.

3. The leakage determination system according to claim 2, wherein the processor configured to
    extract signals in the frequency range from signals generated by the vibration detector, and detect the leakage of the piping based on the extracted signals.

* * * * *